United States Patent
Morovic et al.

(10) Patent No.: US 11,235,532 B2
(45) Date of Patent: Feb. 1, 2022

(54) THREE-DIMENSIONAL OBJECT SUBSTRUCTURES

(71) Applicant: HEWLETT-PACKARD DEVELOPMENT COMPANY, L.P., Houston, TX (US)

(72) Inventors: Peter Morovic, Sant Cugat del Valles (ES); Jan Morovic, London (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 377 days.

(21) Appl. No.: 16/097,667

(22) PCT Filed: Jul. 26, 2016

(86) PCT No.: PCT/US2016/043966
§ 371 (c)(1),
(2) Date: Oct. 30, 2018

(87) PCT Pub. No.: WO2018/022000
PCT Pub. Date: Feb. 1, 2018

(65) Prior Publication Data
US 2020/0331206 A1    Oct. 22, 2020

(51) Int. Cl.
*B29C 64/393*    (2017.01)
*B33Y 50/02*    (2015.01)
(Continued)

(52) U.S. Cl.
CPC ............ *B29C 64/393* (2017.08); *B33Y 50/02* (2014.12); *G06T 5/002* (2013.01); *G06T 17/10* (2013.01);
(Continued)

(58) Field of Classification Search
CPC ....... B29C 64/393; B33Y 50/02; B33Y 50/00; B33Y 10/00; B33Y 30/00; G06T 5/002;
(Continued)

(56) References Cited

U.S. PATENT DOCUMENTS 9,227,424 B1    1/2016    Mantell
2005/0072113 A1    4/2005    Collins et al.
(Continued)

FOREIGN PATENT DOCUMENTS

WO    WO-2016057029 A1    4/2016
WO    WO-2016057031 A1    4/2016

OTHER PUBLICATIONS

Cho et al., ("A dithering algorithm for local composition control with three-dimensional printing" Published 2003—pp. 851-867 (Year: 2003).*

(Continued)

*Primary Examiner* — Quoc A Tran
(74) *Attorney, Agent, or Firm* — Fabian VanCott (57) ABSTRACT

In an example, processing apparatus includes a substructure module to define a substructure for a three dimensional object. The substructure module includes a weighting module to apply relative weights to data relating to each of the plurality of substructures and a blending module to blend data relating to the substructures. The substructure module is to generate data defining an intermediate substructure from a weighted blend of the data relating to the plurality of substructures.

20 Claims, 5 Drawing Sheets

(51) Int. Cl.
*G06T 5/00* (2006.01)
*G06T 17/10* (2006.01)
*B33Y 30/00* (2015.01)
*H04N 1/405* (2006.01)
*G06T 19/00* (2011.01)
*G06K 15/02* (2006.01)
*G06T 17/00* (2006.01)
*B23K 26/354* (2014.01)
*G06F 17/00* (2019.01)

(52) U.S. Cl.
CPC ............. *B23K 26/354* (2015.10); *B33Y 30/00* (2014.12); *G06K 15/02* (2013.01); *G06T 17/00* (2013.01); *G06T 19/00* (2013.01); *H04N 1/405* (2013.01)

(58) Field of Classification Search
CPC ......... G06T 17/10; G06T 17/00; G06T 19/00; G06K 15/02; B22F 10/55; B23K 26/354; H04N 1/405
See application file for complete search history.

(56) References Cited

U.S. PATENT DOCUMENTS

| | | |
|---|---|---|
| 2011/0205583 A1 | 8/2011 | Young et al. |
| 2013/0189028 A1 | 7/2013 | Gershenfeld et al. |
| 2014/0324204 A1* | 10/2014 | Vidimce ............... B29C 64/386 700/98 |
| 2016/0059491 A1* | 3/2016 | Lee ...................... B33Y 30/00 264/40.1 |
| 2016/0096318 A1* | 4/2016 | Bickel .................. B29C 64/106 264/40.1 |

OTHER PUBLICATIONS

Zhou, C.; "Three-Dimensional Digital Halftoning for Layered Manufacturing Based on Droplets"; vol. 37; 2009; http://www-bcf.usc.edu/~yongchen/Research/NAMRC%2037-Halftoning_Final.pdf.

* cited by examiner

THREE-DIMENSIONAL OBJECT SUBSTRUCTURES

BACKGROUND

Three-dimensional objects generated by an additive manufacturing process may be formed in a layer-by-layer manner. In one example of additive manufacturing, an object is generated by solidifying portions of layers of build material. In examples, the build material may be in the form of a powder, liquid or sheet material. In some systems, the intended solidification and/or physical properties may be achieved by printing an agent onto a layer of the build material. Energy may be applied to the layer and the build material on which an agent has been applied may coalesce and bind upon cooling. In other examples, three-dimensional objects may be generated by using extruded plastics or sprayed materials as build materials, which solidify to form an object.

Some printing processes that generate three-dimensional objects use control data generated from a model of a three-dimensional object. This control data may, for example, specify the locations at which to apply an agent to the build material, or where a build material itself may be placed, and the amounts to be placed.

BRIEF DESCRIPTION OF DRAWINGS

For a more complete understanding, reference is now made to the following description taken in conjunction with the accompanying drawings in which.

DETAILED DESCRIPTION

Some examples described herein provide an apparatus and a method for generating control data that may be used to produce a three dimensional object. Some examples allow arbitrary three dimensional content with a variety of specified object properties to be processed and used to generate a three-dimensional object. These object properties may comprise appearance properties (color, transparency, glossiness, etc.), conductivity, density, porosity and/or mechanical properties such as strength, and different object portions may comprise different object properties.

In some examples herein, three-dimensional space is characterised in terms of 'voxels', i.e. three-dimensional pixels, wherein each voxel represents a discrete volume. In data modelling a three dimensional object, a voxel at a given location may have at least one characteristic. For example, it may be empty, or may have a particular color, represent a particular material, and/or a particular object property, or the like. The voxels representing an object may have the same shape (for example, cubic or tetrahedral), or may differ in shape and/or size. A voxel may correspond to a region of a three-dimensional object which is an individually addressable area in additive manufacturing. In some examples in which the intended solidification and/or physical properties may be achieved by printing an agent onto a layer of the build material to form a slice of an object a voxel size may be defined by the thickness of a layer of build material and the surface area of a layer which can be individually addressed with an agent. In some contexts, a voxel may be the resolution to which an object model, an object, or object generation data, is defined.

In some examples, data representing a three-dimensional object is processed to generate control data to be used in generating the object.

In some examples, a material volume coverage representation defines print material data, for example detailing the amount of print materials (such as agent(s) to be deposited onto a layer of build material, or in some examples, build materials themselves), and, if applicable, their combinations. In some examples, this may be specified as a proportional volume coverage (for example, X % of a region of a layer of build material should have agent Y applied thereto). Such print materials may be related to or selected to provide an object property such as, for example, color, transparency, flexibility, elasticity, rigidity, surface roughness, porosity, conductivity, inter-layer strength, density, and the like.

The actual location at which each print material (for example, a drop of an agent) should be applied, as specified in control data, may be determined, for example, using halftoning techniques.

For example, a set of voxels within object model data may have an associated set of material volume coverage vectors. In a simple case, such a vector may indicate that X % of a given region of three-dimensional space should have a particular agent applied thereto, whereas (100-X) % should be left clear of agent. The material volume coverage representation may then provide the input for a 'halftoning' process to generate control data that may be used by an additive manufacturing system to produce a three-dimensional object. For example, it may be determined that, to produce specified object properties, 25% of a layer of build material (or of a portion of a layer) should have an agent applied thereto. The halftoning process determines where the drops of agent fall in order to provide 25% coverage, for example by comparing each location to a threshold value provided in a halftone threshold matrix.

In some examples, data representing a three-dimensional structure or object is 'rasterized', i.e. converted to series of discrete locations, in some examples on a layer-wise basis. The rasterized data may be at the printable resolution of the three-dimensional printing apparatus to which control data may be provided.

In some examples herein, control data is generated such that an object generated according to that data has at least one substructure. For example, the object may be intended to have an open mesh-like structure, which may make it light and/or shock resistant, and/or reduce material usage. The term 'substructure' is used to distinguish from the structure, or form, of an object model. Thus while the object may for example be specified or described in data as having at least one solid portion, a substructure may be imposed on the solid portion such that, in the generated object the portion has, at least partially, a mesh-like structure.

A substructure may be associated with at least one property. In some examples, a first substructure may provide or be associated with a first property—for example a particular (or particular combination of) strength, resilience, density, or the like—while a second substructure may provide a different value for one or a combination of those properties, or a different property or properties. In some examples, it may be that a first portion of an object is to have a first property and/or property value, while a second portion of the object is to have a second property and/or property value. In such an example, there may be a transitional region of the object, in which it may be determined how the first substructure is to interface with the second substructure (or any number of substructures), for example, without undue discontinuations. In examples herein, such a transitional region may be provided by use of at least one intermediate substructure. In other examples, while a plurality of substructures may be explicitly defined and associated with properties, it may be that an object is intended to have an intermediate property. In such an example, it may be a substructure may be 'interpolated' as being intermediate to the two predefined substructures, for example to comprise a property value which is an average of the value for that property in each of the predefined substructures. By combining substructures in this way, object properties (which may include properties such as centre of gravity) may be accurately controlled.

Figure 1:
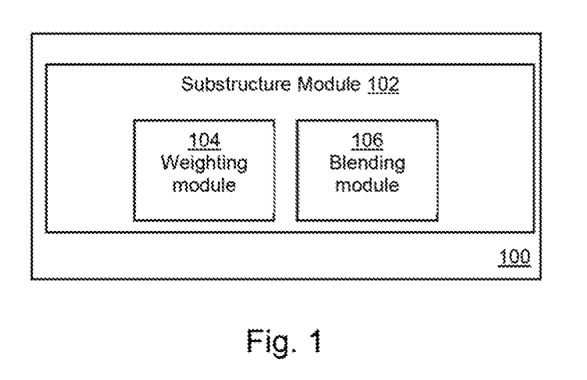
FIG. 1 is a simplified schematic of an example processing apparatus for generating an intermediate substructure.

FIG. 1 is an example of processing apparatus 100 which may be a processing apparatus for defining an intermediate substructure. The processing apparatus 100 comprises a substructure module 102 to define a substructure for a three dimensional object. The substructure module 102 comprises a weighting module 104 and a blending module 106.

The substructure module 102 may define the intermediate substructure based on data relating to a plurality of different substructures. In some examples, the data relating to at least one of the substructures may be data representing an explicit, fully defined three-dimensional model, for example being defined as a vector object. In another example, the data relating to at least one of the substructures may be mathematical or algorithmic data, for example as computer readable instructions which, when executed, can build or generate a representation of a substructure.

Each substructure may, for example, comprise a mesh-like, or lattice structure. Considered in terms of voxels, the physical space occupied by such substructure may comprise a relatively large proportion of un-occupied, or empty voxels. Considered as binary data, the data may comprise a greater proportion of bits indicating empty space than bits representing occupied space. Each substructure may be a continuous regular structure, such as a mesh or three-dimensional lattice formed of space filling polyhedra or prisms (which may form a regular structure such as a three dimensional mesh made up of bar-like structures linking, for example, vertices of polyhedra or prisms, or may comprise a mixture of filled and empty polyhedra, or the like), or irregular (for example, branch-like or vein-like) structure. Each structure may be consistent, or may vary over its volume. In some examples, a substructure may comprise a tilable element such that the element may be tied to form an arbitrarily large volume.

In some examples, the data relating to the substructures may comprise halftoning data. For example, the data may comprise a halftone threshold value stored in relation to each of a plurality of locations (for example, a plurality of voxels), wherein a value indicates the presence of material at that location. However, in other examples, the substructure may be defined using binary data. For example, the data may comprise a bit, i.e. a '0' or a '1', stored in relation to each of a plurality of locations, indicating the absence or presence of the structure at that location. In other examples, such binary data may be derived from halftoning data (which may be null where the substructure does not exist, and present where the substructure does exist).

The substructures may be different in any manner. For example, the substructures may be different in terms of at least one of scale (for example, both a first and second substructures may comprise cubic lattices, but be different in that one is formed of larger cubes than the other), tile type (for example, a first substructure may be a cubic lattice and a second substructure may be a honeycomb lattice), element size (for example, a first substructure may have bar like elements of first diameter and a second substructure may have bar-like elements of a different diameter), form (e.g. geometrically defined based on a polygon, or having a vein or tree-like substructure, for example based on biomimicry), purpose (for example, functional or aesthetic), or the like.

The weighting module 104 is arranged to apply relative weights to data relating to each of the substructures. For example, it may be that an intermediate, or blended, substructure is formed which is closer to a first than a second substructure. In such an example, an intermediate substructure may have four times the contribution from the first substructure than the second substructure. In such an example, the weighting of the first substructure may be 80% and the weighting of the second substructure may be 20%. Three substructures could be combined with a weighting of X %, Y % and Z %, where X+Y+Z=100, and so on, for an arbitrary number of original substructures.

The blending module 106 is arranged to blend data relating to the substructures, which may be blended according to their weighting. In some examples, the blending module 106 may perform a voxel-wise combination of voxel values corresponding to weighted data relating to the substructures. In practice, the data may be expressed in terms of rasterised layers, each corresponding to a slice of an object to be formed, and the blending module 106 may sum the weighted value of a pixel at a given x-y location in a layer representing a first substructure with the weighted value of a pixel at the same x-y location in a layer representing the at least one other substructure. In some examples, the blending module 106 is to apply a threshold to the determined value to return a binary value for each pixel in a layer.

Figure 2A:
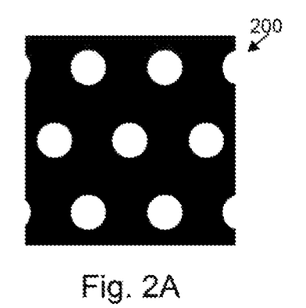
FIGS. 2A-D, 3A-B and 4A-B illustrate stages in an example of determining an intermediate substructure.
Figure 2B:
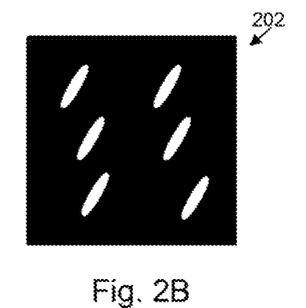

FIGS. 2A and 2B represent, respectively, a binary bit map of a two dimensional slice of a first 200 and a second 202 substructure. In the following example, two different substructures are combined, but other examples, this could be any number. In this example, the first substructure 200 comprises circular features, whereas the second substructure has cigar-shaped features. These features may comprise, for example, a cross-section of bar-like elements which make up a lattice.

Figure 2C:
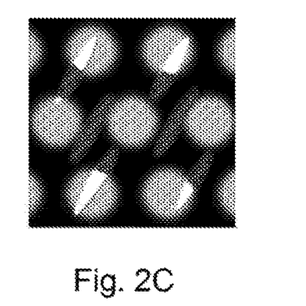

FIG. 2C shows these maps superimposed, having been given a weighting of 80% and 20% respectively and, in this example, having been blurred, or convolved, by a 5×5 pixel (in an x-y plane, in this example the plane of the binary bit map) convolution kernel. As is further set out below, the use of a convolution kernel promotes cross-linkage between different substructures.

It will be noted that, instead of black and white, the features now incorporate shading. In general, the darker the shading, the lower the value of the pixel (in the range 0 to 1). In FIG. 2C, the features from the second substructure (with the lower weighting) are darker than the features from the first substructure. This illustrates that a binary value of 1 for the first substructure is now represented as 0.8 whereas a binary 1 from the second substructure 202 is now represented as 0.2. Moreover, the circular and cigar shaped features are blurred, increasing their size, but the edges are darker in colour. This is a result of the blurring process. Considering an example in which the pixels are blurred before being weighted, a pixel marking an interior boundary of a feature of a substructure is combined with pixel values outside the feature (binary value 0) to reduce its value from 1 to a lower value between 0 and 1, whereas a pixel marking an exterior boundary of a feature of a substructure is combined with pixel values inside the feature (binary value 1) to increase its value from 0 to a higher value between 0 and 1.

It may be noted that, the two geometries coincide over relatively small regions. The blurring operation expands the overlap region thus promoting cross linkage. In the overlap regions, the pixel wise addition of the blurred first 200 and second 202 substructures has resulted in high values, which may be close to or equal to 1, and are therefore indicated as light portions.

In some examples in which a blurring, or convolution kernel, is used, the kernel size may be selected based on the substructures, for example, based on the smallest element size. In some examples the substructures themselves, and/or the kernels, may be based on a type of object generation apparatus available, or the resolution thereof.

In some examples, such a blurring kernel may be applied just to region(s) where the features overlap, or are proximate to one another (for example, which are within the kernel size, so in this example are within 10 pixels of one another). Processing some, but not all, of the pixels may reduce data processing. In addition, blurring in regions where the respective features are distant from one another would not promote cross linkage, but could result in an increase use of materials (which include both print agents and build material, which, if fused, may be recycled), and thus material use may be reduced by avoiding use of the kernel in regions which would not result in a cross-linkage between the substructures. Increased use of material in the region of a transition, however, may enhance the smoothness of the transition and the strength of the substructure in that region Where used, blurring may be applied to each substructure separately, or to the weighted blend of the substructures. In practice, the former option is likely to be less computationally complex because it involves a single convolution operation rather than two (or N, if N substructures are blended) operations.

Thus FIG. 2C shows a schematic representation of an example combined output of applying a convolution and a weighting (for example, using the weighting module 104) based on the first 200 and second 202 substructures.

Figure 2D:
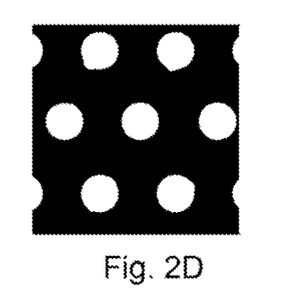

FIG. 2D shows the result of a blending process. In this example, blending comprises applying a threshold to each of the convolved, weighted substructures. The threshold may be selected based on the convolution kernel size. The kernel size determines in effect a quantization of the values. A kernel size of 2×2×2 operating on a binary bitmap would result in $8^2$ (64) possible values between 0 and 1. As the kernel size increases, so does the number of possible values. Likewise, as the size of the kernel increases, the region which is affected thereby (i.e. the extent of the 'blur') also increases. These two factors may impact the selected threshold. For example a threshold of 0.5 for a 2×2×2 kernel would have different effect than the same threshold for a larger kernel (e.g. 4×4×4=$64^2$=4096 possible levels). In this example a threshold of around 0.7 has been applied. Higher thresholds, for a given kernel size, will result in more thickening of the structural elements of the substructures, whereas lower thresholds are more faithful to the original geometry. This provides, in this example a binary result.

As in the example of FIG. 2C, the blending is based on a mix of 80% to 20%, the presence of the circular features dominate whereas the cigar-line features of the second substructure are barely visible—those which overlap with the position of the circle features are perceptible as a bulging in the perimeter of the circles, and those with no overlap are not apparent at all. The circular features have been slightly enlarged, as a result of the blurring meaning that a region outside the original circumference was attributed with a value which exceed the threshold applied in the blending process.

Figure 3A:
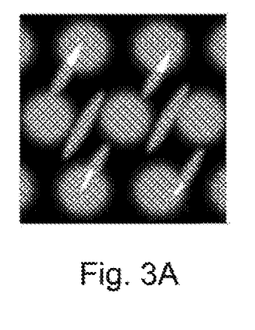
Figure 3B:
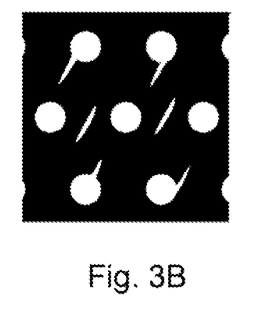

FIGS. 3A, 3B, 4A and 4B illustrate the effect of different weightings between the first and second substructures. FIG. 3A represent a superposition of the first 200 and second 202 substructures, each having had a blurring kernel applied thereto and each given a weighting of 50%. FIG. 3B shows the blended result after a threshold of around 0.5 has been applied. Both substructures are apparent in blended result. The elements of both substructures are somewhat reduced in size, with a bulge in the region where they meet.

Figure 4A:
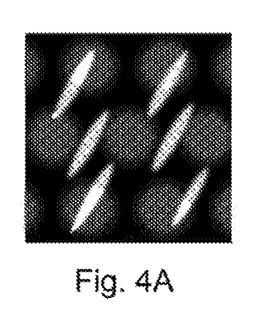
Figure 4B:
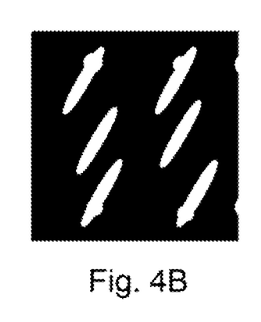

FIG. 4A represent a superposition of the first 200 and second 202 substructures, each having had a blurring kernel applied thereto. In this example, the first substructure is given a weighting of 20% and the second substructure is given a weighting of 0.2. FIG. 46 shows the blended result after a threshold of around 0.7 has been applied. Both substructures are apparent in blended result, but the cigar shaped elements dominate, with the circles being reduced in size. The elements of the first substructure which do not overlap elements of the second substructure are not represented in the blended result.

It may be noted that the cigar-shaped elements, being thinner, may be affected by a blurring kernel across their whole area, while the circles may comprise a region (for example, a central region, which is unaffected).

When the intermediate substructure is to form a transitional region between substructures, a number of intermediate substructures may be defined. The number of different intermediate substructures may be determined based on any, or any combination, of: the thickness of an object region in which the transition may occur (which may for example be a design consideration), the printing resolution, how fine a transition is intended, and the like. In some examples, an intermediate substructure may be determined at a first resolution (which may for example be the finest resolution), and then which could be processed to determine other resolutions are required. This is analogous to a color separation where a transition from a red to a green is to occur over 10 pixels: at most 10 different RGB values are determined. In some examples, the number of intermediate values (or, returning to the present example, substructures) may be determined by the bit-depth of the encoding (or the resolution of an apparatus).

Figure 5:
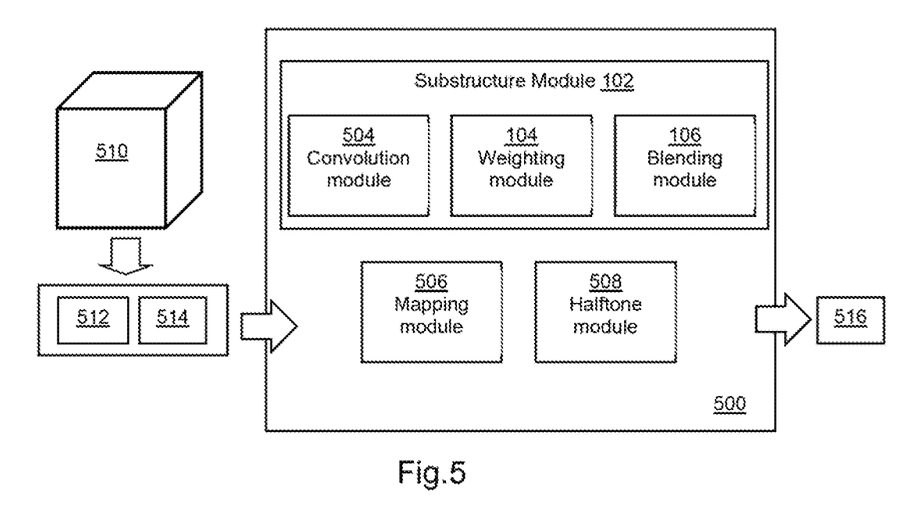
FIG. 5 is a simplified schematic of an example of processing apparatus for generating control data for production of a three-dimensional object.

FIG. 5 shows another example of a processing apparatus 500. In addition to the substructure module 102 comprising a weighting module 104 and a blending module 106 as described in relation to FIG. 1, the processing apparatus 500 further comprises an a convolution module 504, a mapping module 506 and a halftone module 508.

The processing apparatus 500 is arranged to receive data representing a three-dimensional model object, for example via an interface. In this example, the data representing a three-dimensional model object 510 comprises object model data 512 and object property data 514. The object model data 512 may define a three-dimensional model of at least a portion of the model object 510. In FIG. 5, the object 510 is a simple cube although it will be appreciated that the object could have other, and more complex, forms. The model object 510 may define the shape and extent of all or part of an object in a three-dimensional co-ordinate system, e.g. the solid portions of the object. The object model data 512 may be generated by a computer aided design (CAD) application. Object property data 514 defines at least one object property for the three-dimensional object to be generated. In one case, the object property data 514 may comprise a color, flexibility, elasticity, rigidity, surface roughness, porosity, interlayer strength, density, conductivity and the like for at least a portion of the object to be generated. Object property data 514 may be defined, for example, for the whole of an object to be generated, e.g. global property data, or for one or multiple portions of an object to be generated, e.g. local property data. The object property data 514 may be used to define multiple object properties for a portion or portions of an object.

In some examples, the processing apparatus 500 may receive the object model data 512 and the object property data 514 as a single file; in other examples the processing apparatus 500 may receive portions of the object model data 512 and/or the object property data 514 as multiple data objects, wherein the object model data 512 and the object property data 514 are distributed across a number of associated data structures. In one example, the object model data 512 may comprise voxels that are defined in a three-dimensional (also referred to herein as [x,y,z]) space. A given voxel may have associated data that indicates whether a portion of the model object 510 is present at that location. As described above, the object property data 514 may comprise global and local object property data, e.g. certain object property values as defined in the object property data 514 may be associated with each voxel that defines the object and/or certain object property values may be associated with a set of voxels, e.g. ranging from individual voxels to all voxels associated with the object. In one case, the data representing the three-dimensional object comprises a model of a three-dimensional object that has at least one object property specified at every location within the model, e.g. at every [x, y, z] co-ordinate.

The processing apparatus 500 may also receive data representing or relating to, the plurality of substructures, for example via an interface.

In some examples, at least the object model data 512 may be processed to generate a rasterized representation of the three-dimensional object. In an example, slices of parallel planes of a model of the three-dimensional object may be generated and rasterized. Each slice may relate to a portion of a respective layer of build material in an additive manufacturing system. In a three-dimensional space that uses a three-coordinate system, e.g. that uses [x, y, z] co-ordinates, these parallel planes may be z-slices, planes that are parallel to x and y axes (or the xy-plane). Each z-slice may comprise portion(s) of a model that have a common z co-ordinates and that extend in the x and y dimensions. The number of z-slices may depend on a resolution of detail in the z dimension and/or the output resolution of a layer of build material(s).

The convolution module 504, which in this example comprises part of the substructure module 102, is to apply a convolution kernel to data relating to each substructure. The data relating to the substructures may be combined prior to applying the convolution kernel (for example, using the blending module 106 described above), or data relating to each substructure may be separately processed using the convolution kernel. The data may be data defining the substructure. In other examples, the data defining the substructures may have been processed, for example a weighting applied thereto by the weighting module 104 before the convolution kernel is applied. In examples in which data defining the substructures is provided as halftone data, binary data may be derived therefrom and the convolution kernel may be applied to that binary data.

In some examples, the convolution kernel is a blurring kernel. In examples where substructures are considered in three dimensions, this for example be a three-dimensional, for example spherical, kernel. For example, the kernel may be of the order of 5×5×5 voxels (in an example where a voxel may be the smallest addressable area in an object generation process, which may be a layer to be formed in object generation, or may be a voxel defined in any arbitrary three dimensional, e.g. [x, y, z], space). The blurring kernel may for example apply a Gaussian function to each voxel such an average of a value for that voxel and for nearby (i.e. within the kernel radius) voxels are determined, with the weight attributed to the kernels diminishing with distance. In other examples, other blurring kernels may be used.

The actions of the blending module 106 and the convolution module 504 promote cross-linkage, i.e. elements of the substructures will tend to merge. This may enhance a smooth transition between the substructures in examples in which the intermediate substructure is to form at least part of a transitional object portion.

The mapping module 506 is arranged to map received data to a volume coverage representation relating to object property data at a given location. In an example, the mapping module 506 may receive raster objects. These may be received one by one, e.g. in an order representative of an ascending height of the object, or as a collection, e.g. all slices of the model object. In one example, the mapping module 506 maps object properties to material volume coverage (Mvoc) vectors. In some examples, the mapping module may receive the object model data 512 and the object property data 514 from an interface directly.

An Mvoc vector may have a plurality of values, wherein each value defines a proportion for each print material, or each combination of print materials in an addressable location of a layer of the three-dimensional object. For example, in an additive manufacturing system with two available print materials (for example, agents)—M1 and M2, where each print material may be independently deposited in an addressable area of a layer of the three-dimensional object, there may be $2^2$ (i.e. four) proportions in a given Mvoc vector: a first proportion for M1 without M2; a second proportion for M2 without M1; a third proportion for an over-deposit (i.e. a combination) of M1 and M2, e.g. M2 deposited over M1 or vice versa; and a fourth proportion for an absence of both M1 and M2. In this case an Mvoc vector may be: (M1, M2, M1M2, Z) or with example values [0.2, 0.2, 0.5, 0.1]—i.e. over a given region in a z slice, 20% of locations will receive M1 without M2, 20% of locations will receive M2 without M1, 50% of locations will receive M1 and M2 and 10% will be left clear of agent. As each value is a proportion and the set of values represent the available material combinations, the set of values in each vector sum to 1 or 100%.

For example, in a case where the agents are colored, then the Mvoc vector may be determined to generate select agent combinations that generate a match with a supplied object property, e.g. a supplied RGB value. This match may be implicit in the mapping.

The substructures which are combined and/or the intermediate substructure may comprise any structure, such as a regular three-dimensional lattice (e.g. a honeycomb structure based on any space-filling polyhedral such as a cube, and octahedron, or the like), a space-filling polyhedron, forms of bio-mimicry (e.g. vein or branch-like design), or the like. Each of these substructure types may be referred to as a substructure model. In some examples, a substructure model may be defined explicitly by having an input three-dimensional model that describes its geometry in its entirety, for example in a vector domain and/or designed using a CAD program. In other examples, the structure of a sub-structure model may be defined implicitly or analytically, for example as being based on a regular lattice, space-filling polyhedral, or fractals, or otherwise generated according to machine readable instructions. In some examples, substructure models may be formed of tile-able elements, such that a structure (for example a cubic structure, or an octahedron structure, or a branch-like element) may be repeated in forming a substructure model. Such a file-able elements may be used as a seed to provide a substructure for an object to be generated. In some examples, the substructure module 102 may tile a base element or seed, such as a cube or other shape, to provide a substructure. In some examples, the substructure module 102 may generate a rasterized representation of at least one substructure model.

For example a substructure may comprise a stacked cuboid mesh or cubic lattice structure which is relatively sparse in its occupied volume. The substructure module 102 may effectively replicate, or tile, data representing a number of cubes or cuboid meshes until the substructure would occupy the same volume as the model object 510. In other examples, other shapes or forms could be replicated and tiled to form a substructure, or the substructure model could be 'grown', for example from space filling polyhedra, in its entirety, for example to fill a predetermined volume, which may the same as the volume of the model object 510.

The halftone module 508 is arranged to provide halftoning threshold data, and, in this example, to output control data 516. In this example, the control data 516 may be used in generating an object based on the input object data 512, 514 with the addition, in at least a portion thereof, of the intermediate substructure.

In some examples, the processing apparatus 500 may apply at least one substructure and a halftoning to the volume coverage representation to generate control data for the production of a three-dimensional object having the substructure. In other words, the substructure may be applied to model data, such that, in at least a region thereof, the model has voids where the substructure has voids and is present where the substructure is present. This may in effect impose a lattice substructure onto at least a region of the object.

In some examples, the halftone module 508 may populate the substructure (or combined substructures) to be imposed on the object. In other examples, the halftone module 508 may populate a representation of the object, and the substructure(s) may be imposed thereafter. In some examples, the halftoning module 508 may be arranged to apply halftoning data to object data which has already had the substructure imposed thereon.

In one example, halftoning data may be received as a halftone threshold matrix. In one example, the threshold matrix may comprise the same dimensions as the three-dimensional substructure model and/or model object itself (i.e. be a three dimensional thresholding matrix). In other examples, the threshold data may be supplied in a different form (for example, portions of a larger threshold matrix may be used), or may be generated according to stored machine readable instructions, or the like.

In examples in which the original substructures were defined using halftone values, the received substructure data may comprise the original halftoning data, which may be used to populate the intermediate substructure. For at least some, and in many examples (for example, where no blurring kernel is used), all the location in which the intermediate substructure exists, at least one of the original substructures will also exist. Therefore, the halftone data for that location may be used to populate the intermediate substructure. For locations where more than one original substructure exists, an average, which may be a weighted average may be used, or one of the values may be selected (in some examples, on a probabilistic basis, which may be weighted) for use at that location.

In some examples (which may involve the use of a convolution kernel) there may be locations in the intermediate substructure which are not present in any original substructure. In such examples, a fully populated halftone threshold matrix may be used, and the geometry of the intermediate substructure could be intersected with such a fully populated matrix. If all the original substructures are associated with common halftone distribution (for example, being a generic blue-noise distribution), then such a halftone matrix could be generated and used to populate the intermediate substructure. If the respective structural matrices have different, for example custom, halftone matrix distributions, then a halftone matrix which is proportionally populated with the values of each distribution could be used.

In some examples, the halftone data comprises an array of threshold values. In one example, the threshold values are for carrying out a halftone operation that compares a value of the threshold matrix against a value indicative of a print material (such as an agent(s) or agent combination) probability distribution, for example expressed as an Mvoc (material volume coverage) vector. This chooses a single 'state' (one of the possible materials or material combinations) based on the threshold value.

The print material volume coverage may vary within an object and this variation may be taken into account at the point of constructing a halftone threshold data. For example, a threshold matrix (or matrices) that natively has 'continuous tone' threshold values can be formatted to have local variability. In some examples, the material volume coverage may vary between planes.

In other examples, halftone data may be provided in some other manner and used to populate at least part of the intermediate substructure, object or object modified to include the intermediate substructure with halftone data to provide a halftone matrix. The halftone data may be determined according to halftoning techniques such as void-and-cluster matrices, error diffusion techniques, dither based techniques, AM-screens, cluster-dot type patterns etc. In some examples, the substructure model may be directly populated with halftone data determined, for example, according to one of these techniques. In some examples, the chosen halftone scheme may be selected according to attributes thereof. In some examples, the chosen halftone scheme may vary over the object and/or substructure. For example, a blue-noise 3D halftone matrix may be used by default but for objects or regions of objects having thin features, a cluster-dot scheme may be used to generate halftone data to preserve such features. In other words, in some examples, the halftone module 508 may be arranged to determine halftone threshold values based on the geometry of at least one of the object and the substructure to be applied thereto.

In some examples, locations in the intermediate substructure at which the structure exists may be populated with a halftone threshold to provide such a halftoning matrix, which may, in examples, be a two dimensional or three dimensional halftone threshold matrix.

For example, the substructure module 102 may define substructure planes, each plane relating to a plane of a three-dimensional object. Such planes may be rasterized into discrete locations to provide a series of arrays. If the substructure comprises a relatively large proportion of un-occupied, or empty voxels, each plane may be a partially, or sparsely, populated array of values. In some examples, the array is binary: the structure either exists at a location or it does not. In some examples, the array may be in the form of a plurality of binary bitmaps, each binary bitmap representing a plane of the substructure. The halftone module 508 may populate a substructure plane with halftone threshold data. This provides a two-dimensional halftoning matrix reflecting (in at least some layers, or portions of layers) the intermediate substructure (for example, there may be no, or null, data relating to the locations where the substructure does not exist in that plane). In still other examples, the halftone module 508 to provide halftoning threshold data, wherein the halftone module 508 is to populate a substructure to provide a three dimensional halftone threshold matrix having a substructure and the halftone threshold matrix may be applied to the volume coverage representation to generate the control data. Such two or three dimensional halftone threshold matrix may be suitable for use in generating control data for manufacturing a three-dimensional object with additive manufacturing apparatus, for example such that the object generated has the intermediate substructure.

In this example, the substructure module 102 is arranged to define an intermediate substructure using the convolution module 504, weighting module 104 and blending module 106, and to define a substructure for a three dimensional object comprising the intermediate substructure. In other words, a three dimensional object may be generated to comprise, in at least a region thereof, the intermediate substructure. Such an intermediate substructure may for example provide a set of properties which are not provided by any original substructure, which in some examples may be one or set of properties which are intermediate to the properties provided by each of the original substructures. In some examples such an object may also comprise, in at least a region comprising at least one of the original substructures. In a particular example, at least one intermediate substructure may be defined and used in a transition region to allow a continuous or substantially continuing linking between regions of an object having a first substructure and regions of the object having at least one other substructure.

A halftone matrix may be based on such a substructure, i.e. may be populated with instructions to selectively cause a print material to be deposited where the substructure exists and can be applied to a volume coverage representation (for example an Mvoc vector) to generate control data, for example in the form of a set of discrete print material choices for a pixel in a plane, wherein the discrete values across the area of the plane may be representative of proportions set out in the volume coverage representation. In some examples, an intermediate substructure model is rasterized before being populated.

In some examples, a 3D matrix or a stack of 2D matrices of halftone data carries the structure of an intermediate substructure model: for example, the matrix may be null in all locations other than those characterising the structure such that applying the matrix will result in no use of an print material at that null location, whatever the volume coverage specified for the location.

The substructure module 102 may be arranged to process at least one of the original or intermediate substructures. For example, such substructure may be scaled according to the information indicative of an object to be generated. This allows a substructure of an appropriate size to be generated.

In some examples, scaling a substructure may comprise tiling, or replicating, a base 'seed' element of the structure. In other examples, scaling the substructure may comprise scaling the substructure or a base element thereof itself: for example, if the substructure is made up of cubic structures, the size of the cube may be determined. Scaling may comprise matching the overall size of the object to be generated (such that, for example, the object and the extent of a lattice comprising a substructure are substantially the same size, or can be described by a voxel array of the same size). In other examples, scaling may comprise matching the size of the portion of an object to have that substructure (i.e. the substructure could vary over a generated object). Scaling may comprise considering the size of the smallest features of the object to be generated and ensuring that such details can be represented by a substructure of appropriate scale. Scaling may also comprise a consideration of the properties specified for an object to be generated, such as the amount of material to be in a particular volume to ensure that the object has a specified strength.

Scaling may be carried out automatically or with user input. In some examples, a particular structure (e.g. a regular cubic lattice) may be defined at a plurality of resolutions/scales (e.g. using cubes of different sizes as a base element), such that scaling the three-dimensional substructure comprises selecting one of the predefined structures.

While the examples above are set out in relation to blending two substructures to form an intermediate substructure, more than two substructures may be combined according to these principles.

Figure 6:
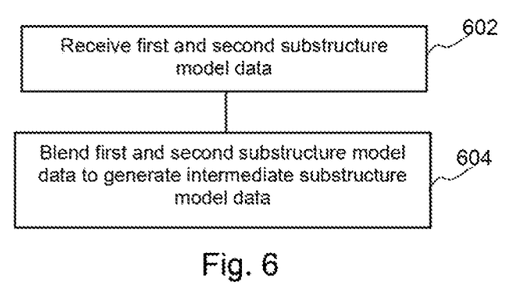
FIG. 6 is an example of a method for generating an intermediate substructure.

FIG. 6 is a flow chart providing an example of a method, which may be a method of generating intermediate substructure model data. In some examples, the method is a computer-implemented method, for example using at least one processor.

Block 602 comprises receiving first substructure model data representing a first three-dimensional material structure and a second substructure model representing a second, different, three-dimensional material structure. In block 604, an intermediate substructure model data representing at least one intermediate three-dimensional material structure is generated. Any or each of the first, second and intermediate three-dimensional material structure may comprise a mesh-like or lattice structure. In some examples, generating the intermediate substructure model data comprises determining a weighted blending of the first and second substructure model data, in which each of the first and second substructures models have a predetermined weight. In some examples, determining the weighted blending comprises applying a blurring convolution kernel.

As will be appreciated from the foregoing, more than two substructures may be combined to form the intermediate substructure.

Figure 7:
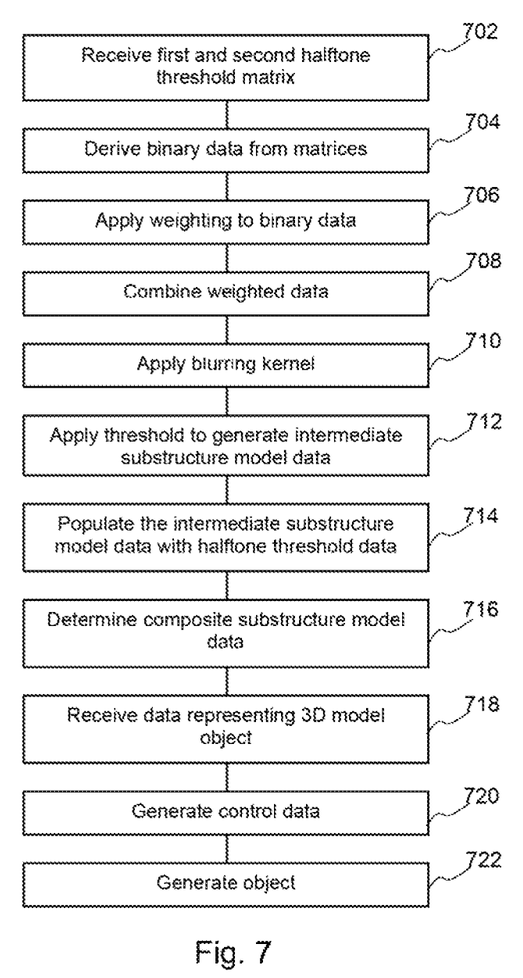
FIG. 7 is an example of a method for generating control data for production of a three-dimensional object.

FIG. 7 is an example of a method for generating control data.

In this example, in block 702, a first and second halftone matrix are received, the first and second halftone matrices representing the structures of a first and second substructure model. These halftone threshold matrices may be suitable for use in generating control data for manufacturing a three-dimensional object with additive manufacturing apparatus, for example such that the object generated has the substructure specified by the associated substructure. Such matrices may comprise an array of voxels representing a lattice structure, and/or may be based on, or grown from, a seed or base element, such as a cube or other space-filling polyhedron which follows predetermined rules. There may be a number of substructure models and obtaining the matrices may comprise selecting substructure models. At least one such substructure may be a relatively open mesh structure. At least one such substructure may vary over its volume. In some examples, the matrices may represent rasterized planes.

In block 704, binary data defining the first and second substructures is derived from the matrices, such data representing the presence or absence of the respective lattice structures of the first and second substructures. In some examples this may comprise a rasterized representation of the respective structures.

In this example, in block 706, a weighting is applied to the binary data associated with each of the substructures and, in block 708, the weighted data is combined.

Block 710 comprises applying a blurring kernel to the combined data. In some examples, this may be applied to some, but not all, parts of the combined data, for example (as is discussed above) the blurring kernel may be applied to data relating to positions where both the first and second substructures exist (or are close to one another).

In block 712, a threshold is applied to the resulting data to determine intermediate substructure model data. In this example, values for pixels or voxels which are below the threshold are given the value '0' whereas values which are equal to or above the threshold are given the value of 1. In this example, the intermediate substructure model data comprises binary data representing the presence or absence of the intermediate structure.

Block 714 comprises receiving halftone threshold data and using the halftone threshold data to populate each location in the intermediate substructure model data at which the intermediate substructure exists (in this example, locations (or more particularly, data points associated with locations) associated with a '1'). In this example, the halftone data comprising the received halftone matrices may be used to populate the locations. As noted above, in examples where there are locations at which the neither original substructure exists, a fully populated halftone matrix (which may be a proportional combination of different halftone matrices associated with the original substructures) could be intersected with the geometry of the intermediate substructure. Such a matrix could be used to populate all locations, or just those locations where no original substructure exists.

In block 716, a composite substructure model data is determined, the model data representing at least one composite structure, the composite structure in this example comprising the intermediate structure and the first and second substructures. In this way, an object having the composite structure would have a first region comprising the first substructure, a second region comprising the second substructure and a third region comprising the intermediate substructure. Other composite structures may comprise some, but not all, of the original substructures. In this example, the intermediate structure serves as a transitional region such that there is at least one continuous link between a portion of an object having the first substructure and a portion of the object having the second substructure. Such a transitional portion may comprise more than one intermediate substructure, for example with the weighting changing from being in favour of the first substructure to being in favour of the second substructure, in some examples via at least one intermediate substructure. The number of different intermediate substructures may depend how different the first and second substructures are, and/or may be determined such that there is at least one continuous link between the first and second substructures, for example bearing in mind the distance or volume in which the transition is to occur and/or the resolution of an object generation apparatus (as discussed above), or the like. In this example the composite substructure model data comprises a halftone matrix.

Block 718 comprises receiving data representing a three dimensional model object. For example, this data may specify the form of a three dimensional object, in some examples also comprising at least one object property. In an example the data may comprise a three-dimensional bit-map comprising an M×N×L array of voxels representing a three dimensional model object (which may be all or a portion of an object) is obtained, in which M. N and L are positive integers and in which each voxel is located at a unique three-dimensional location. In some examples, the M×N×L array of voxels is a cuboid which encloses at least a portion of (and in some examples, all of) a three dimensional model object. In some examples, each voxel representing the three dimensional object is represented as a volume coverage representation, the volume coverage representation specifying print material as proportions of a set of available print materials at the location. In some examples data describing the object may be mapped to data representing the object using a volume coverage representation. In some such examples, being so mapped, the model object may be rasterized into a plurality of planes. The number of planes used may depend on any of several factors, for example, the type of build material, type of coalescing agent, type of coalescence modifier agent(s) used, thickness per layer to provide the properties and/or finish etc.

Block 720 comprises generating control data, the control data being to generate a three-dimensional object having, in at least a portion thereof, the intermediate substructure (and in this example, having a material substructure according to the composite substructure model). In this example, this comprises applying the halftone data carrying this substructure to the data representing a three dimensional object.

For example a volume coverage representation of an object may be compared with the threshold values of the threshold matrix representing the same three-dimensional location to generate control data for generating a three-dimensional object based on the model object and having a material substructure according to the composite substructure model.

Block 722 comprises generating an object according to control data. For example, this may comprise using any additive manufacturing, or three-dimensional printing, techniques. Such an object may therefore comprise voids in location(s) where a substructure does not exist even if the data representing a three dimensional model object indicated that the object would exist (i.e. be solid) at that location.

The blocks of FIG. 7 may be carried out in a different order. For example, the blurring kernel may be applied to the data representing the first and second structures (i.e. block 710 may follow block 706). Block 716 may be carried out before block 714. Data representing a three dimensional model object may be received before an intermediate substructure is generated (and in some examples, at least one substructure model may be based, at least in part, on the object data). Other variations are possible.

Figure 8A:
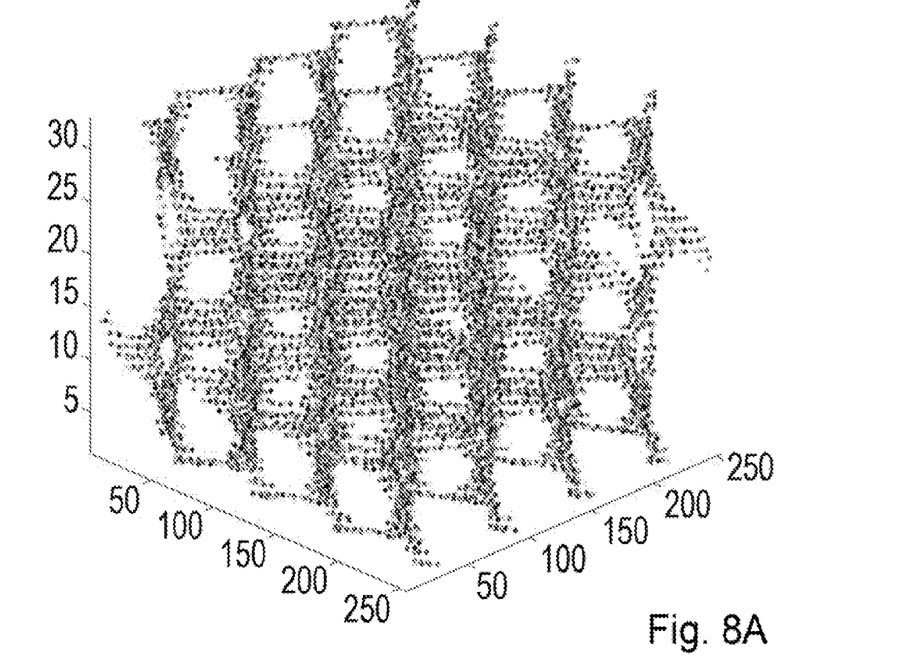
FIGS. 8A-C show an example of combining two three dimensional substructures.
Figure 8B:
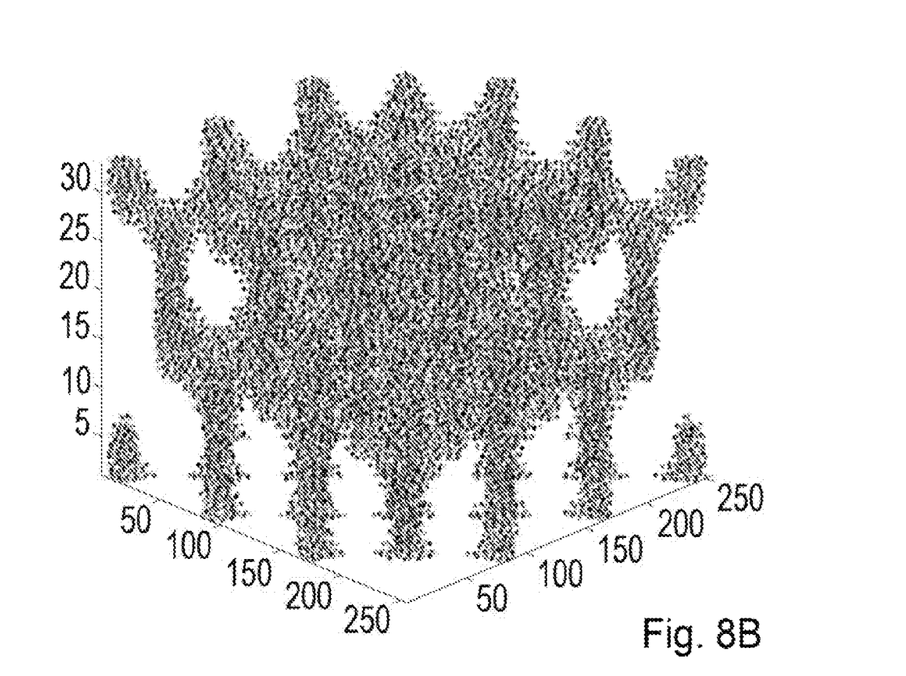
Figure 8C:
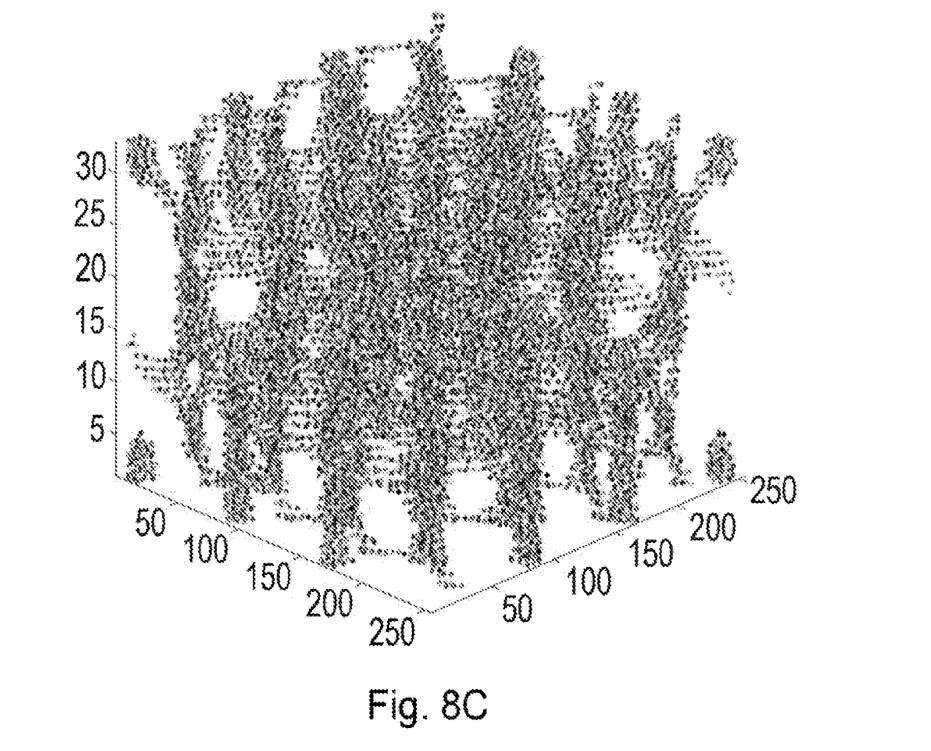

FIGS. 8A-8C show an example of blending substructures in three dimensions. A first substructure comprising a halftone matrix is shown in FIG. 8A and a second substructure comprising a halftone matrix is shown in FIG. 8B. FIG. 8C shows an 80:20 blend of the substructures of FIGS. 8A and 8B respectively. This blend operates in three dimensions. i.e. the blurring kernel is spherical and operates on both intertayer and intralayer relationships. It may be noted that the combination of the relatively sparse matrix of FIG. 8A and the relatively dense matrix of FIG. 8B has resulted in a matrix of intermediate density in FIG. 8C.

Figure 9:
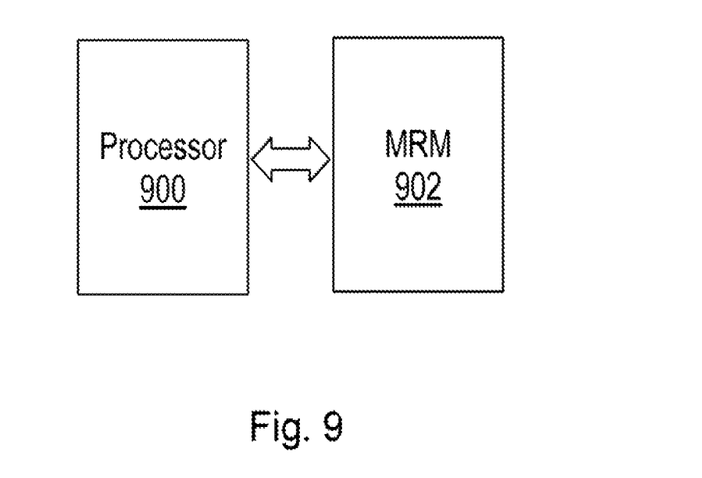
FIG. 9 is an example of processor associated with a machine readable medium.

FIG. 9 shows an example of a processing apparatus 900 in conjunction with a non-transitory, tangible machine readable medium 902 comprising instructions which, when executed, cause the processing apparatus 900 to:

determine, from a first and second substructure, an intermediate substructure comprising a weighted blend of the first and second substructure obtain data representing a three dimensional model object; and generate control data, the control data being to generate a three-dimensional object having, in at least a portion thereof, the intermediate substructure. The weighted blend may comprises a weighted blend of at least one substructure in addition to the first and second substructure.

The medium 902 may comprise instructions to cause the processing apparatus 900 to carry out any of the blocks of FIG. 6 or FIG. 7.

The processing apparatus 100, 500, or at least some modules thereof, may comprise part of additive manufacturing apparatus, which may be arranged to generate an object having a substructure. In other examples, the processing apparatus 100, 500 may supply control data or at least one halftone threshold matrix for use by additive manufacturing apparatus.

In some examples herein, a model object is provided in order that an object may be generated. However, the generated object is intended to have a substructure which is provided not as model object data, but as a part of a halftoning operation. For example, this may mean that the generated object has voids at location(s) where the substructure does not exist, even if, according to the model object, the model was to exist at such location(s). This allows a substructure to be specified separately and/or applied later in design pipeline, and therefore a new or different substructure may be more readily applied to an object to be generated. An intermediate substructure comprise a substructure defined using at least two other substructures. In some examples, the substructure may be a transitional substructure to provide a link between two other substructures.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus, such the processing apparatus 100, 500 or any module thereof may execute the machine readable instructions. Thus functional modules of the apparatus and devices (for example, any of the substructure module 102, weighting module 104, blending module 106, convolution module 504, mapping module 506 and halftone module 508) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices provide a means for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It should be noted that the above-mentioned examples illustrate rather than limit what is described herein, and that those skilled in the art will be able to design many alternative implementations without departing from the scope of the appended claims. In particular, a feature or block from one example may be combined with or substituted by a feature/block of another example The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. An additive manufacturing system comprising a processor programmed to implement a substructure module to define a substructure for a three dimensional object to be formed by the additive manufacturing system, the substructure module comprising:

a weighting module to apply relative weights to data relating to each of a plurality of different substructures; and a blending module to blend data relating to the substructures, wherein the substructure module is to use weighted data from the weighting module as input for the blending module to generate data defining an intermediate substructure from a blend of the weighted data relating to the plurality of substructures, wherein the blending module performs a voxel-wise combination of voxel values corresponding to weighted data relating to the substructures.

2. Additive manufacturing system according to claim 1 further comprising a convolution module to apply a convolution kernel to data relating to the plurality of substructures.

3. Additive manufacturing system according to claim 1 further comprising a mapping module to map received data representing a three-dimensional model object to a volume coverage representation at a given location.

4. Additive manufacturing system according to claim 3 further comprising a halftone module to provide halftoning threshold data, wherein the processor is to apply a substructure and a halftoning to the volume coverage representation to generate control data for production of a three-dimensional object having the intermediate substructure.

5. Additive manufacturing system according to claim 4 wherein the halftone module is to determine halftone threshold values based on a geometry of either the object or the intermediate substructure.

6. Additive manufacturing system according to claim 1 further comprising a halftone module to provide halftoning threshold data, wherein the halftone module is to generate a halftone threshold matrix having, in at least a portion thereof, the intermediate substructure.

7. Additive manufacturing system according to claim 1 in which the substructure module is to define a substructure for a three dimensional object comprising the intermediate substructure.

8. Additive manufacturing system according to claim 7 in which the substructure module is to define a substructure for a three dimensional object comprising the intermediate substructure and at least one of the plurality of substructures.

9. Additive manufacturing system according to claim 1 in which the data related to each of the plurality of different substructures is halftone data, and the data defining the intermediate substructure comprises halftone data from blending of the data related to different substructures.

10. A method comprising: receiving, at a processor, first substructure model data representing a first three-dimensional structure and second substructure model data representing a second, different, three-dimensional structure; and generating, using a processor, intermediate substructure model data representing at least one intermediate three-dimensional structure, wherein generating the intermediate substructure model data comprises combining the first substructure model data and the second substructure model data based on weights to apply the intermediate substructures relative weights to data relating to each of a plurality of different substructures; and generating, using a processor, blending data relating to the substructures, wherein the substructure is to generate data defining an intermediate substructure from a weighted blend of the data relating to the plurality of substructures and a voxel-wise combination of voxel values corresponding to weighted data relating to the substructures.

11. A method according to claim 10 wherein generating the intermediate substructure model data comprises determining a weighted blending of the first and second substructure model data, in which each of the first and second substructures model data have a predetermined weight.

12. A method according to claim 11 in which the intermediate substructure model data is binary data representing a presence or absence of the intermediate three-dimensional structure, and in which generating the intermediate substructure model data comprises applying a threshold to the weighted blending of the first and second substructure model data.

13. A method according to claim 12 further comprising receiving halftone threshold data and populating, by at least one processor, each location at which the intermediate structure exists with halftone threshold data.

14. A method according to claim 11 in which generating the intermediate substructure model data comprises applying, by at least one processor, a blurring convolution kernel to at least one of:

at least a portion of the first and second substructure model data; and at least a portion of a weighted blend of the first and second substructure model data.

15. A method according to claim 11 further comprising applying a blurring kernel to at least a portion of the weighted blending of the first and second substructure model data.

16. A method according to claim 15 further comprising populating an intermediate substructure model by applying halftone threshold data to the weighted blending of the first and second substructure model data after the blurring.

17. A method according to claim 10 further comprising determining, by at least one processor, composite substructure model data representing at least one composite structure, the composite structure comprising the intermediate structure and at least one of the first and second three-dimensional structures.

18. A method according to claim 10 further comprising receiving, at least one processor, data representing a three dimensional model object;

generating, by at least one processor, control data, the control data being to generate a three-dimensional object having, in at least a portion thereof, the intermediate structure; and generating an object according to the control data.

19. A method according to claim 10 further comprising scaling at least one of the substructures based on an object model of an object to be formed, the object comprising the first and second three dimensional structures.

20. A non-transitory machine readable medium comprising instructions which, when executed, cause a processing apparatus to:

determine, from a first and second substructure, an intermediate substructure comprising a weighted blend of the first and second substructure;

obtain data representing a three dimensional model object; and generate control data, the control data being to generate a three-dimensional object having, in at least a portion thereof, the intermediate substructure wherein a voxel-wise combination of voxel values corresponding to weighted data relating to the substructures.

* * * * *